United States Patent [19]

Wichterle

[11] 4,445,362
[45] May 1, 1984

[54] METHOD FOR MEASUREMENT OF THE CAVITY VOLUME OF SOFT CONTACT LENSES AND THE APPARATUS FOR THIS MEASURING METHOD

[75] Inventor: Otto Wichterle, Prague, Czechoslovakia

[73] Assignee: Ceskoslovenska akademie ved, Prague, Czechoslovakia

[21] Appl. No.: 361,828

[22] Filed: Mar. 25, 1982

[51] Int. Cl.³ .............................................. G01F 17/00
[52] U.S. Cl. ........................................ 73/37.5; 73/149
[58] Field of Search ........................... 73/149, 37, 37.5

[56] References Cited

U.S. PATENT DOCUMENTS 3,459,032  8/1969  Yamaguchi ........................... 73/149

FOREIGN PATENT DOCUMENTS 493642  11/1975  U.S.S.R. ................................. 73/149

Primary Examiner—S. Clement Swisher
Attorney, Agent, or Firm—Murray Schaffer

[57] ABSTRACT

A soft contact lens is rested freely on a planar or convex (preferably spherical) surface immersed in a liquid. The liquid enclosed between the inner surface of lens and the planar or convex surface is sucked off and the volume of sucked off liquid is measured. A vessel with immersion liquid, having a plane or convex surface of its bottom is provided with a hole, which is connected with a measuring capillary tube through a broadened inlet chamber containing a mercury drop. The measuring capillary tube is furnished with a scale corresponding to its volume and is connected, at the outlet, with a drain or pressure reservoir through a broadened outlet chamber and a unit for pressure variation. The volume sucked off is determined by the shift in the mercury drop.

12 Claims, 1 Drawing Figure

U.S. Patent May 1, 1984 4,445,362
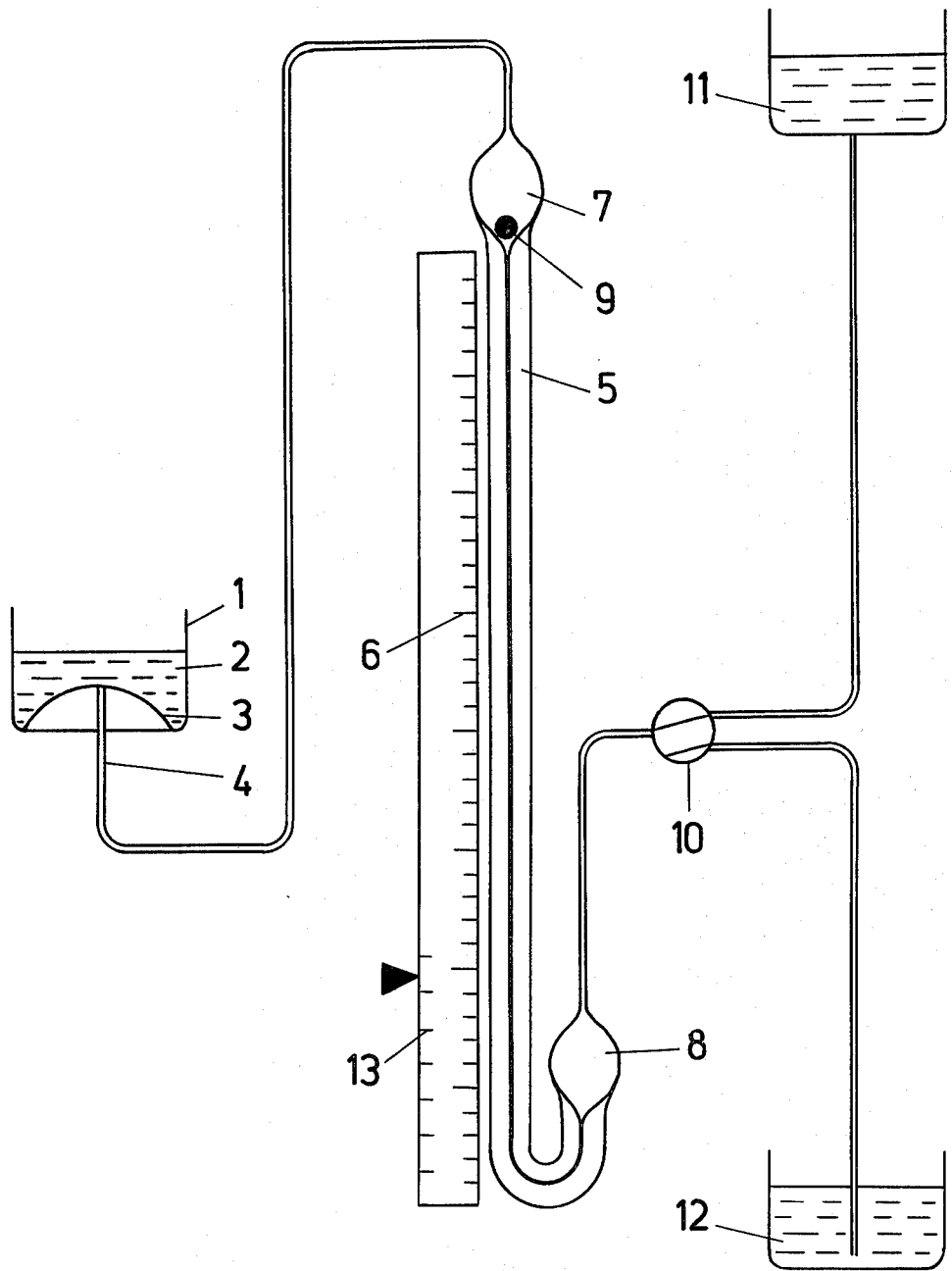

METHOD FOR MEASUREMENT OF THE CAVITY VOLUME OF SOFT CONTACT LENSES AND THE APPARATUS FOR THIS MEASURING METHOD

BACKGROUND OF THE INVENTION

The invention pertains to a method for the measurement of the cavity volume of soft contact lenses and to the apparatus for performance of this method.

Until the present time, the following methods have been used for characterizing the shape of soft contact lenses (either hydrophilic or hydrophobic), necessary for their correct selection according to the examined shape of patient's eye:

1. A needle is shifted into the center of lens, which freely rests by its circumference on a planar base, as far as to the contact with the inner apex of lens. The sagittal depth of the lens determined in this way serves, together with the measured diameter of lens, as a rough measure of its total convexity.

2. Similarly, a needle is slided into the lens resting symmetrically on a circular edge of chosen diameter and the mean curvature of lens above this diameter is measured in this way.

3. A lens freely placed in an immersion liquid in a cell is measured by means of a projection or by means of photographic equipment.

4. A lens freed of surface water is measured by its reflection to determine the whole course of its inner or outer curves.

The methods 1, 2 and 4 are subjected to errors, arising from the deformation of soft lens by gravitational forces. Such measurement is entirely impossible with ultrathin lenses.

The method 3, where the immersed lens is not subjected to these deforming forces, is reliable for measurement of the lens shape, but it is very elaborate, because pictures must be made additionally precisely measured to evaluate the projection. In addition to this, strong reflections of tangentially illuminated surfaces occur at the side projection, thus making impossible the realiable measurement of the inner surface, which shape is even more important for application than the shape of the outer surface of the lens.

SUMMARY OF THE INVENTION

The above shortcomings are removed by the method for measurement of the cavity volume of soft contact lenses according to the present invention, which consists in resting the contact lens freely on a planar or convex suction surface in a liquid immersion, such as water or a physiologic saline solution, subsequently the immersion liquid enclosed in the space between the inner surface of contact lens and the planar or convex suction surface is pumped off and the volume of this liquid, which is a characteristic constant of contact lens is measured. The volume of sucked-off liquid is advantageously indicated by the shift of a mercury column enclosed from both sides by the measured liquid in a capillary tube. For this purpose, the initial position of mercury drop may be easily adjusted by broadening the capillary tube upwards at least at one of its ends. The extreme position of the mercury drop, at one or at both ends of the capillary tube, is secured by broadening the inner diameter of the capillary tube at the end upwards into a chamber of the multiple size of inner diameter, so that mercury cannot be washed off even under a strong flow of liquid. If the flow of liquid ceases, the mercury rests in the form of a ball in the broadened inlet of the chamber and closes the capillary tube in the defined way. At the inverse flow of the liquid, the mercury drop moves as a short column along the measuring capillary tube. At the same time, mercury is strongly pushed to the wall of capillary by its high surface tension, so that only a very thin film of the liquid remains on the wall in the position of mercury drop and the space of capillary is very precisely divided by the mercury drop. The pressure pushing the mercury drop to walls is inversely proportional to the diameter of capillary according to $$p = (0.0153/d)(kg/cm^2),$$

where p is the pressure and d is the inner diameter of capillary in mm.

If one assumes, in the first approximation, that the thickness of the thin liquid film, adhering to the wall of capillary in the place of passing mercury drop, is inversely proportional to the pressure developed by the drop on the wall, it can be concluded that the ratio of the volume of liquid shifted in the capillary to the volume of adhering film is constant for the given speed of shifting and does not depend on the inner diameter of capillary. This explains the fact, that the accuracy of measured volume is preserved in this method, even when extraordinarily fine capillaries are used, which enable the precise measurement also of very small amounts of liquid.

It was found, that only a very small underpressure is needed to suck perfectly a soft lens to the suitably chosen surface (base), viz. 2 to 10 cm of water column. This holds also for lenses of maximal thickness, e.g. for lenses for ophakics. This fact evidences the advantages of this arrangement. Measurements of the sucked-off volume by means of a piston or a corrugated box (bellows) would be subjected to large errors because much higher force would be necessary to overpower mechanical resistances than is the minimal force needed for suction. In addition to this, mechanical parts would require high precision, because the accuracy of measurement in limits of one $mm^3$ of sucked-off liquid is needed.

Numerous methods and the corresponding equipments were developed for the precise measurement of very small amounts of liquid, e.g. for volumetric microanalysis, where the zero position in measuring tube is automatically set. Where mechanically controlled piston devices are not concerned, which always demand high precision and therefore are relatively costly, numerous so called automatic microburettes were developed, where the level of liquid is set in the measuring tube by hydrostatically operated equipment mostly by allowing the liquid exceeding the zero level to flow off through an overflow or by sucking this liquid off through a fixed auxiliary thin capillary, which is dipped at a precise depth. A disadvantage of these devices consists in the nonuniform shape of meniscus of the small-diameter tubes, which causes differences in the zero setting as a consequence of various wetting of wall by the liquid.

Another objective of the invention is to provide an apparatus for performing the aforesaid method, which consists of a vessel for immersion liquid with a bottom furnished with a planar or convex, preferably spherical, suction surface provided with a hole, which is connected to a measuring capillary tube also filled with the immersed liquid. The measuring capillary tube is equipped with a scale, corresponding to the volume of the measuring capillary tube, and connected at the inlet with a broadened inlet chamber placed above the measuring capillary tube. The outlet of the measuring capillary tube is connected through a broadened outlet chamber with a drain for measured liquid, while a drop of mercury is placed in the broadened inlet chamber. The output chamber is advantageously connected to the unit for pressure variation. This unit for pressure variation may consists advantageously of a two-way cock or a system of valves with analogous function, which serves for connecting the outlet chamber either with an overpressure reservoir or with an underpressure drain.

Application of the spherical suction surface of radius 12.5 mm is of particular advantage. This surface has on diameters 13.5 and 14.5 mm about the same tangent as an average eye of the same diameter. The difference between the volume of section caps of an average eye and the volume of the spherical cap of the same width and radius 12.5 mm is therefore practically constant (67 mm$^3$). If we set the linear volume scale at the capillary tube in such a way, that the initial position of mercury drop points to $-67$ mm$^3$ on the scale, the position of the drop after suction of the lens indicates directly the difference between the cavity volume of lens and the volume of axial segment of an average eye of the same width, i.e. so called suction volume, which serves for suction of lens to an average eye.

If the patient's eye was measured in such a way, that the deviation of the volume of 13.5 to 14.5 mm wide axial segment of its eye from the segment of an average eye of the same width may be derived from the obtained parameters, this deviation may be directly compared with the measured volume deviation of lens from the same average eye. It can be objectively ascertained in this way, which suction volume will operate in the application of the measured lens to the measured eye.

The volume of sucked-off liquid is relatively small, of order of magnitude in tens of microliters. If the measurement accuracy about plus-minus one microliter is required and if the position of mercury droplet should be read on the scale by naked eye with the same accuracy, without using a magnifying glass or cathetometer, the inner diameter of capillary tube should not be larger than about 1 mm. On the other hand, extremely small diameters cannot be used for the reduced visibility of column and for increasing errors due to irregular or irreproducible wetting of capillary wall. As follows from experience, the most suitable are capillary tubes of inner diameter 0.5 to 2 mm.

Concerning the material of capillary tube, its transparency or at least a suitable translucency is a condition.

Glass capillary tubes are obviously the best. On the other hand, it is simpler to use for the measurement capillary tubes which serve, at the same time, for connection with the vessel and also with the controlling the pneumatic equipment. Since the pressure changes inside the system are minimal, even capillary tube made of relatively soft material may be used, e.g. of plasticized poly(vinyl chloride) or silicon rubber.

The position of measuring capillary tube has no effect on the accuracy of measurement. It may be placed vertically, horizontally, or in any sloped position.

The progressiveness of invention, in comparison with the recent state of technique, consists mainly in the ability to measure fast and reliably ultrathin contact lenses, as well as other lenses. While the measurement is faster than with known methods, the investment cost is substantially lower, and the measurement does not require professionally skilled attendance.

BRIEF DESCRIPTION OF THE DRAWING

The invention is further illustrated in the drawing which diagrammatically shows a apparatus for measurement of cavity volume of soft contact lenses.

DESCRIPTION OF THE INVENTION

The apparatus consists of the vessel 1 for immersion liquid 2, which has on its bottom 3 a planar or convex, e.g. spherical, suction surface furnished with the hole 4, which is connected with the measuring capillary tube 5 also filled with the same immersion liquid. The measuring capillary tube 5 is provided with a scale 6, corresponding to the volume of measuring capillary tube 5, which inlet communicates with the broadened inlet chamber 7 placed above the measuring capillary tube 5. The outlet of measuring capillary tube 5 is connected through the broadened outlet chamber 8 with the drain for measured liquid. A drop of mercury 9 is placed in the broadened inlet chamber 7. The outlet chamber 8 is connected to the unit for pressure variation, which consists of the two-way cock 10, or a set of valves of the analogous function, and serves for connecting the outlet chamber 8 either with the overpressure reservoir 11 or with the underpressure drain 12.

The apparatus is ready for measurement if all its capillary tubings, the measuring capillary tube and the vessel with lens are filled with physiologic saline and the mercury drop 9 is transferred into the broadened inlet chamber 8 by the flow of solution from the reservoir 11. Then, measurement is carried out by closing the cock 10 for a short time (about half a minute) to allow the mercury drop 9 sit into the upper inlet of measuring capillary tube 5 and the contact lens 14 placed in the vessel 1 perfectly rests on the suction surface of bottom 3 of the vessel 1. Then, the capillary is connected with the drain 12 placed below it by turning the two-way cock 10, thus causing the perfect suction of contact lens 14 to the bottom 3 of vessel 1 by the thus created underpressure. The sucked-off volume is indicated by the position of the mercury drop 9 in the measuring capillary tube 5. The cavity volume is then the sum of the indicated volume and the volume assumed by the section cap of bottom 3 of vessel 1 covered with the contact lens of known diameter. If the bottom is spherical, the cavity volume may be read directly by setting the sliding scale 6, which sits close to the measuring capillary tube 5, by means of the auxiliary scale 13 of lens diameter, into such position, that the upper inlet of measuring capillary tube is at the volume on the scale 6 corresponding to the volume assumed by spherical cap of the diameter of measured contact lens.

I claim:

1. The method of measuring the cavity volume of a soft contact lens comprising the steps of immersing the contact lens in a container of an aqueous media, causing said contact lens to freely rest on the bottom of said container within said media, withdrawing the aqueous media from the area defined by the contact lens and the bottom of said container and thereafter measuring the amount of aqueous media thus withdrawn.

2. The method according to claim 1, including the step providing a bottom for said container having a convex spherical shape.

3. The method according to claim 1, including the steps of arranging a capillary tube filled with said aqueous media in communication with the area between said lens and said bottom, allowing said aqueous media to pass out of the other end of said capillary and measuring the movement of said aqueous media within said capillary tube.

4. The method according to claim 3, wherein said measurement is effected by the steps of placing a droplet of mercury with said capillary tube and measuring the movement thereof.

5. Apparatus for measuring the cavity volume of a soft contact lens comprising a container for the receipt of an aqueous media having a bottom on which said lens may freely rest under immersion, a hole provided in said bottom to which means for withdrawing said aqueous media disposed between the lens and the bottom may be connected, means for withdrawing said thus disposed aqueous media and means for measuring said withdrawn aqueous media.

6. The apparatus according to claim 5, wherein said bottom is convexedly spherical.

7. The apparatus according to claim 6, wherein the means for withdrawing said aqueous media comprises a vacuum system comprising a capillary tube communicating at one end through said bottom with the area above the surface of said bottom and by its other end with a drain.

8. The apparatus according to claim 7, wherein an enlarged upwardly oriented inlet chamber and outlet chamber is provided at the respective ends of said capillary tube.

9. The apparatus according to claim 8, wherein said means for measuring said withdrawn aqueous media consists of a droplet of mercury located in said capillary system, and a scale associated with said capillary tube for measuring the distance moved by said mercury droplet on drainage of said disposed aqueous media.

10. The apparatus according to claim 9, wherein the outlet chamber is connected to means for varying the pressure in said capillary system.

11. The apparatus according to claim 10, wherein said means for varying the pressure comprises valve means selectively connected with one of said drain and a pressure reservoir.

12. The apparatus according to claim 6, wherein said bottom has a radius of $12.5 \pm 0.5$ mm.

* * * * *